June 5, 1928.
A. J. SORENSEN
1,672,005
ELECTRICAL APPARATUS
Filed June 25, 1927
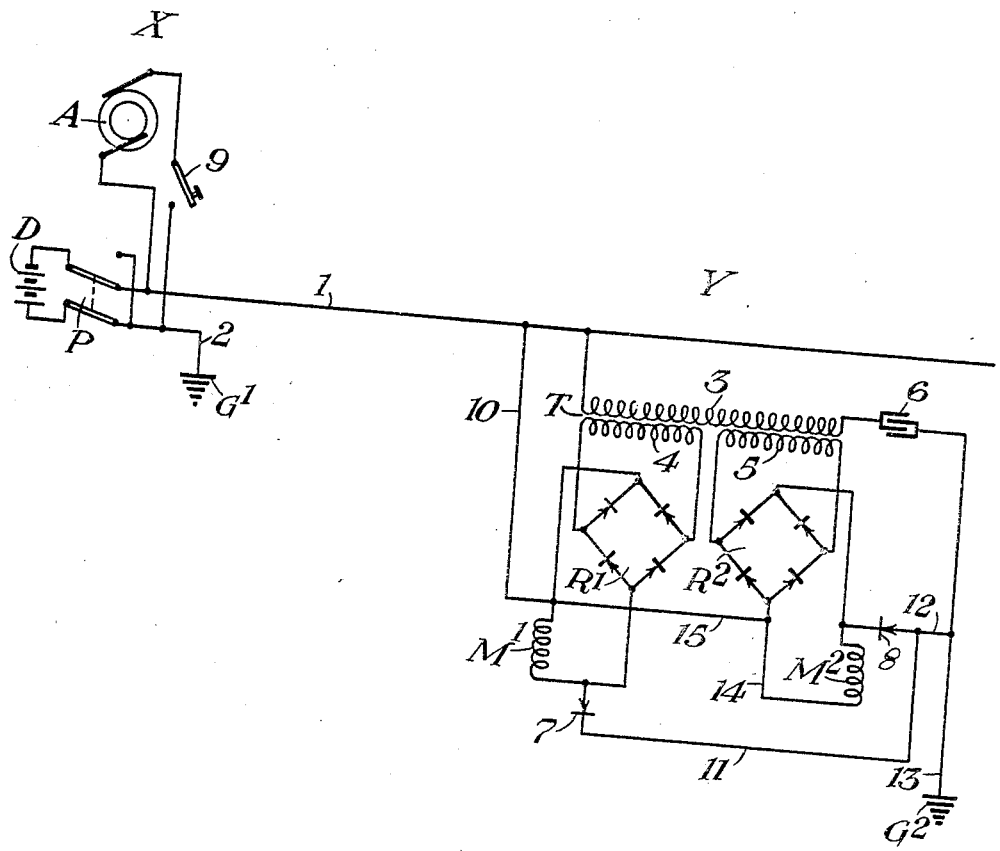
INVENTOR;
A. J. Sorensen,
by A. R. Verrill
His Attorney Patented June 5, 1928.

1,672,005

UNITED STATES PATENT OFFICE.

ANDREW J. SORENSEN, OF WILKINSBURG, PENNSYLVANIA, ASSIGNOR TO THE UNION SWITCH & SIGNAL COMPANY, OF SWISSVALE, PENNSYLVANIA, A CORPORATION OF PENNSYLVANIA.

ELECTRICAL APPARATUS.

Application filed June 25, 1927. Serial No. 201,299.

My invention relates to electrical apparatus, and has for an object the provision of novel and improved means for energizing two magnet windings when alternating current is supplied to a pair of conductors, and for selectively energizing one or the other of said windings according as direct current of normal or reverse polarity is supplied to said conductors.

I will describe one form of apparatus embodying my invention, and will then point out the novel features thereof in the claims.

The accompanying drawing is a diagrammatic view showing one form of apparatus embodying my invention.

Referring to the drawing, the reference characters X and Y designate a transmitting station and a receiving station respectively, which stations are connected by two conductors. One of these conductors is a wire 1, and as here shown the other conductor comprises wires 2 and 13 as well as the ground between the two stations, the two latter wires being connected with the ground at points $G^1$ and $G^2$ respectively.

Located at the transmitting station X is a source of direct current D, such for example as a battery, which may be reversibly connected with wires 1 and 2 through a pole-changer P, so that direct current of normal or reverse polarity may be supplied to the two conductors. The reference character A, designates a source of alternating current which may at times be connected across wires 1 and 2 through a manually operable circuit controller 9. It will be seen, therefore, that wires 1 and 2 may be supplied with direct current of normal or reverse polarity, or these wires may be supplied with alternating current.

Located at the receiving station Y is a transformer T having a primary 3 and two secondaries 4 and 5. One terminal of the primary 3 is connected with the conductor 1, and the other terminal of this primary is connected through a condenser 6 with ground at the point $G^2$, so that the primary 3 forms a part of a path between conductor 1 and ground. Secondary 4 is connected with a first magnet winding $M^1$ through a full-wave rectifier $R^1$ and secondary 5 is connected with a second magnet winding $M^2$ through a full-wave rectifier $R^2$. It follows, therefore, that when alternating current is supplied to conductors 1 and 2, both magnet windings $M^1$ and $M^2$ will receive uni-directional current, so that both of these magnet windings will be energized.

A second path is provided between conductor 1 and ground $G^2$, which path includes wire 10, magnet winding $M^1$ an asymmetric unit 7, and wire 11, 12 and 13. Asymmetric unit 7 permits direct current of normal polarity, but not of reverse polarity, to flow through the magnet winding $M^1$. A third path is provided between conductor 1 and ground $G^2$, which path includes wires 10, 15 and 14, magnet winding $M^2$, an asymmetric unit 8, and wires 12 and 13. The asymmetric unit 8 permits direct current of reverse polarity, but not of normal polarity, to flow through magnet winding $M^2$. It follows that when direct current of normal polarity is supplied to the two conductors, magnet winding $M^1$ will be energized, but magnet winding $M^2$ will be de-energized, whereas when direct current of reverse polarity is supplied to the two conductors, magnet winding $M^2$ will be energized and magnet winding $M^1$ will be de-energized. The condenser 6 prevents direct current from flowing through the primary 3 of transformer T.

Each of the asymmetric units 7 and 8 may be of the type comprising a metal having a compound of the metal formed thereon, which type of unit is disclosed and claimed in an application filed by L. O. Grondahl on the 7th day of January, 1925, Serial No. 1111, for uni-directional current-carrying devices. Each rectifier $R^1$ and $R^2$ may be made up of a plurality of units of the same character.

It will be observed that when direct current of normal polarity is supplied to the two conductors, the rectifier $R^1$ opposes the flow of such current around magnet winding $M^1$ whereas when direct current of reverse polarity is supplied to the two conductors, the rectifier $R^2$ opposes the flow of such current around magnet winding $M^2$.

Apparatus embodying my invention is particularly suitable for use in connection with the control of the brakes on a railway train. When used in this manner, the two sources of current, as well as the pole-changer P and the circuit controller 9, will usually be located on the locomotive, whereas the two magnet windings $M^1$ and $M^2$, as well as the apparatus associated with these windings, will be located on each car of the train. The conductor 1 will then extend throughout the train, and the ground points $G^1$ and $G^2$ will be the wheels and axles of the locomotive and cars, or a second metallic conductor may be provided between points X and Y in place of the ground. The magnet windings $M^1$ and $M^2$ may be used to control the brakes in any suitable manner. For example, the control of the brakes may be such that when both magnet windings $M^1$ and $M^2$ are de-energized, an emergency brake application will result; when both of these magnet windings are energized, the brakes will be held in running condition; when magnet winding $M^1$ is energized and magnet winding $M^2$ de-energized, a service brake application will result; and when magnet $M^2$ is energized and magnet $M^1$ is de-energized, the condition which is ordinarily obtained by placing the brake valve in lap position will result. It should be understood, however, that this assignment of functions is capable of variation to meet the requirements of the braking system. The apparatus for the control of the brakes forms no part of my present invention and is omitted from the drawing to simplify the disclosure.

Although I have herein shown and described only one form of apparatus embodying my invention, it is understood that various changes and modifications may be made therein without departing from the spirit and scope of my invention.

Having thus described my invention, what I claim is:

In combination, two conductors, means for supplying said conductors with alternating current or with direct current of normal or reverse polarity, a transformer having a primary and two secondaries, a path across said two conductors including said transformer primary and a condenser, two magnet windings connected with said two secondaries respectively, a full wave rectifier interposed between each secondary and the associated magnet winding a second path across said conductors including one of said magnet windings and an asymmetric unit which permits direct current of normal polarity but not of reverse polarity to flow through said winding, and a third path across said conductors including the other magnet winding and an asymmetric unit which permits direct current of reverse polarity but not of normal polarity to flow through the winding.

In testimony whereof I affix my signature.

ANDREW J. SORENSEN.